US008218880B2

(12) United States Patent
Zhao et al.

(10) Patent No.: US 8,218,880 B2
(45) Date of Patent: Jul. 10, 2012

(54) LINEAR LAPLACIAN DISCRIMINATION FOR FEATURE EXTRACTION

(75) Inventors: Deli Zhao, Beijing (CN); Zhouchen Lin, Beijing (CN); Rong Xiao, Beijing (CN); Xiaoou Tang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 915 days.

(21) Appl. No.: 12/129,515

(22) Filed: May 29, 2008

(65) Prior Publication Data

US 2009/0297046 A1  Dec. 3, 2009

(51) Int. Cl.
G06K 9/62 (2006.01)
G06K 9/00 (2006.01)
G06K 9/46 (2006.01)

(52) U.S. Cl. .................. 382/224; 382/118; 382/190
(58) Field of Classification Search .............. 382/118, 382/224, 190
See application file for complete search history.

(56) References Cited

U.S. PATENT DOCUMENTS

| | | | | |
|---|---|---|---|---|
| 4,348,553 | A * | 9/1982 | Baker et al. | 704/241 |
| 5,754,681 | A | 5/1998 | Watanabe et al. | |
| 6,282,318 | B1 * | 8/2001 | Dietrich et al. | 382/209 |
| 7,010,167 | B1 | 3/2006 | Ordowski et al. | |
| 7,082,394 | B2 | 7/2006 | Burges et al. | |
| 7,117,151 | B2 | 10/2006 | Iwahashi et al. | |
| 7,376,752 | B1 * | 5/2008 | Chudnovsky et al. | 709/245 |
| 2005/0123202 | A1 | 6/2005 | Hwang et al. | |
| 2005/0201595 | A1 | 9/2005 | Kamei | |
| 2005/0238238 | A1 | 10/2005 | Xu et al. | |
| 2007/0122041 | A1 | 5/2007 | Moghaddam et al. | |

OTHER PUBLICATIONS

Belhumeur et al. "Eigenfaces vs. Fisherhaces: Recognition Using Class Specific Linear Projection" IEEE Trans. on Pattern Analysis and Machine Intelligence, vol. 19, No. 7, Jul. 1997.*
Belkin et al. "Laplacian Eigenmaps for Dimensionality Reduction and Data Representation" Dec. 8, 2002.*
He et al. "Face Recognition Using Laplacianfaces" IEEE Trans. on Pattern Analysis and Machine Intelligence, Mar. 2005 (vol. 27 No. 3) pp. 328-340.*
Cai, et al., "Learning a Spatially Smooth Subspace for Face Recognition", available at least as early as Oct. 22, 2007, at <<http://www-faculty.cs.uiuc.edu/~hanj/pdf/cvpr07_dengcai.pdf>>, pp. 7.
Cai, et al., "Spectral Regression for Efficient Regularized Subspace Learning", available at least as early as Oct. 22, 2007, at <<http://www-faculty.cs.uiuc.edu/~hanj/pdf/iccv07_dengcai_SR.pdf>>, pp. 8.

(Continued)

Primary Examiner — Bhavesh Mehta
Assistant Examiner — Utpal Shah
(74) Attorney, Agent, or Firm — Lee & Hayes, PLLC

(57) ABSTRACT

An exemplary method for extracting discriminant feature of samples includes providing data for samples in a multidimensional space; based on the data, computing local similarities for the samples; mapping the local similarities to weights; based on the mapping, formulating an inter-class scatter matrix and an intra-class scatter matrix; and based on the matrices, maximizing the ratio of inter-class scatter to intra-class scatter for the samples to provide discriminate features of the samples. Such a method may be used for classifying samples, recognizing patterns, or other tasks. Various other methods, devices, system, etc., are also disclosed.

20 Claims, 6 Drawing Sheets

OTHER PUBLICATIONS

He, et al., "Locality Preserving Projections (LPP)", available at least as early as Oct. 22, 2007, at <<http://www.cs.uchicago.edu/files/tr_authentic/TR-2002-09.pdf>>5, pp. 8.

Zhao, et al., "Linear Laplacian Discrimination for Feature Extraction", at <<http://mmlab.ie.cuhk.edu.hk/2007/CVPR07_feature.pdf>>, IEEE, 2007, pp. 7.

* cited by examiner

PROCESSED IMAGES FOR A SUBJECT FOR TRIALS 200

GALLERY SET 202

PROBE SET 204

LINEAR LAPLACIAN DISCRIMINATION FOR FEATURE EXTRACTION

BACKGROUND

Discriminant feature extraction plays a central role in recognition and classification. Principal component analysis (PCA) is a classic linear method for unsupervised feature extraction. PCA learns a kind of subspaces where the maximum covariance of all training samples is preserved. More specifically, PCA is mathematically defined as an orthogonal linear transformation that transforms given data to a new coordinate system such that the greatest variance by any projection of the data comes to lie on the first coordinate (called the first principal component), the second greatest variance on the second coordinate, and so on. PCA is theoretically the optimum transform for given data in least square terms.

To facilitate explanation of various techniques, consider face recognition where data are presented in the form of image data. The ability to perform face recognition can be tested according to standards of the Face Recognition Grand Challenge (FRGC). For example, a FRGC version 2.0 test consists of three components: (i) a data set of images of a person (i.e., a face); (ii) a Biometric Experimentation Environment (BEE) distribution that includes all the data sets for performing and scoring trials; and (iii) a set of baseline algorithms for performing trials. With all three components, it is possible to run trials by processing raw images to producing Receiver Operating Characteristics (ROCs) where performance can be judged based on ROCs.

A conventional approach involves so-called "eigenfaces", which are a set of eigenvectors used in the computer vision problem of human face recognition. To explain an eigenvector, consider that a linear transformation may operate on a vector to change it, for example, by changing its magnitude and its direction. An eigenvector of a given linear transformation is a non-zero vector which is multiplied by a constant called the eigenvalue as a result of that transformation. The direction of the eigenvector is either unchanged by that transformation (for positive eigenvalues) or reversed (for negative eigenvalues). In general, linear transformations of a vector space, such as rotation, reflection, stretching, compression, shear or any combination of these, may be visualized by the effect they produce on vectors. In other words, linear transformations are linear vector functions. Eigenfaces, which are a set of eigenvectors, are derived from the covariance matrix of a probability distribution of a high-dimensional vector space of possible faces of human beings.

To generate a set of eigenfaces, a large set of digitized images of human faces, taken under similar lighting conditions, can be normalized to line up the eyes and mouths. The images can then be resampled at the same pixel resolution. Eigenfaces can be extracted out of the image data by PCA. For example, the following steps can convert an image of a face into eigenfaces: (i) prepare a training set "T"; (ii) subtract the mean where the average matrix "A" is calculated and subtracted from the original in "T" and the results stored in variable "S"; (iii) calculate the covariance matrix; (iv) calculate the eigenvectors and eigenvalues of the covariance matrix; and (v) choose the principal components.

In step (iv), there will be a large number of eigenfaces and, in general, far fewer are needed. To reduce the number, one can select those that have the largest eigenvalues. For instance, a set of 100 pixel by 100 pixel images will create 10,000 eigenvectors. Since most individuals can be identified using a database with a size between 100 and 150, most of the 10,000 eigenvectors can be discarded.

In a typical example, the eigenfaces created will appear as light and dark areas that are arranged in a specific pattern. This pattern represents how different features of a face can be singled out to be evaluated and scored. Often patterns exist to evaluate symmetry, style of facial hair, hairline position, nose size or mouth size. Other eigenfaces can have patterns that are less simple to identify and the image of the eigenface may look very little like a face.

Techniques used in creating eigenfaces may find use outside the realm of facial recognition. For example, the foregoing technique has also been used for handwriting analysis, lip reading, voice recognition, sign language/hand gestures and medical imaging. Therefore, some prefer use of "eigenimage" instead of eigenfaces.

As mentioned, the so-called eigenfaces method for face recognition applies PCA to learn an optimal linear subspace of facial structures. PCA also plays a fundamental role in face sketch recognition. Locality Preserving Projections (LPP) is another typical approach for un-supervised feature extraction. LPP is the linearization of Laplacian Eigenmaps, which can find underlying clusters of samples. LPP shows superiority in terms of image indexing and face recognition.

The "Laplacian faces" face recognition method is based on the combination of PCA and LPP, in the sense that LPP is performed in the PCA-transformed feature space. However, un-supervised learning cannot properly model underlying structures and characteristics of different classes.

Discriminant features are often obtained by class supervised learning. Linear discriminant analysis (LDA) is the traditional approach to learning discriminant subspaces where the between-class scatter of samples is maximized and the within-class scatter is minimized at the same time. The so-called Fisherfaces algorithm and many variants of LDA have shown good performance in face recognition in complex scenarios.

By defining representations of intra-personal and extra-personal differences, Bayesian face recognition proposes another way to explore discriminant features via probabilistic similarity measure. In one study, the inherent connection between LDA and Bayesian faces was unified in a more general form.

LDA algorithm has the advantages of being reasonable in principle and simple in form. The conventional LDA algorithm is formulated by the ratio of between class scatter and the within-class scatter which are represented by norms measured with Euclidean metrics. So there is an underlying assumption behind LDA that it works in Euclidean spaces. However, there are many scenarios where sample spaces are non-Euclidean in computer vision. For instance, distances between feature vectors yielded by histograms cannot be measured by Euclidean norms. In this case, some non-Euclidean measures are usually applied, such as the Chi squares statistic, the log-likelihood statistic, and the histogram intersection. The primary formulation of LDA does not hold in non-Euclidean spaces. As a consequence, LDA fails to find the optimal discriminant subspace.

As described herein, various exemplary techniques can be applied to high dimensional spaces that may have non-Euclidean metrics. While the foregoing discussion mentions face recognition, various exemplary techniques can be applied in areas other than face recognition and in areas where data are other than "image" data.

SUMMARY

An exemplary method for extracting discriminant feature of samples includes providing data for samples in a multidimensional space; based on the data, computing local similarities for the samples; mapping the local similarities to weights; based on the mapping, formulating an intra-class scatter matrix and an inter-class scatter matrix; and based on the matrices, maximizing the ratio of inter-class scatter to intra-class scatter for the samples to provide discriminate features of the samples. Such a method may be used for classifying samples, recognizing patterns, or other tasks. Various other methods, devices, system, etc., are also disclosed.

DESCRIPTION OF DRAWINGS

Non-limiting and non-exhaustive examples are described with reference to the following figures.

DETAILED DESCRIPTION

Figure 1:
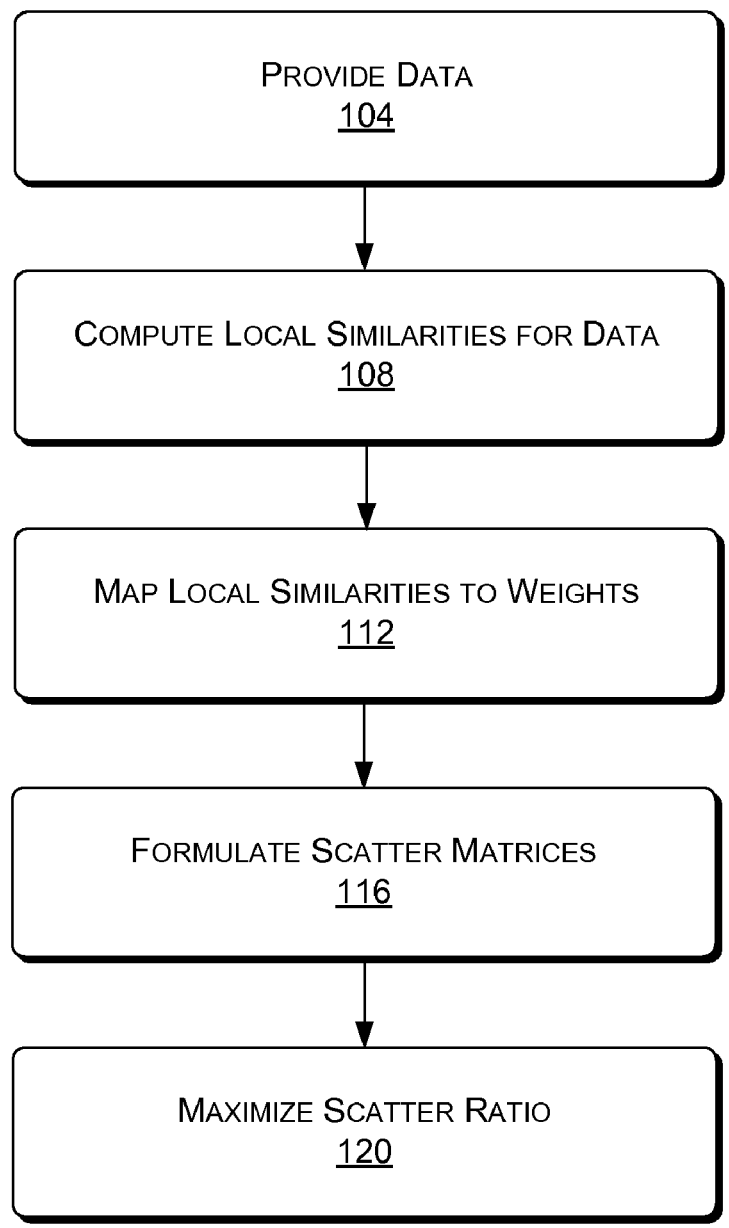
FIG. 1 is a diagram of an exemplary method for analyzing data using linear Laplacian matrices.

Discriminant feature extraction plays a fundamental role in pattern recognition. As described herein, various exemplary methods employ a Linear Laplacian Discrimination (LLD) algorithm for discriminant feature extraction.

In various examples, LLD is presented as an extension to Linear Discriminant Analysis (LDA). As noted in the Background section, LDA does not work well in cases where sample spaces are non-Euclidean. To handle non-Euclidean spaces, an exemplary LLD approach defines within-class scatter and between-class scatter using similarities which are based on pair-wise distances in sample spaces. In this approach structural information of classes is contained in the within-class and the between-class Laplacian matrices are free from metrics of sample spaces. In turn, the optimal discriminant subspace can be derived by controlling the structural evolution of the Laplacian matrices.

Trials results are presented further below where data were selected from the facial database for Facial Recognition Grand Challenge (FRGC) version 2. Trial results show that LLD is effective in extracting discriminant features. While such trial data pertain to images, various exemplary techniques described herein can be applied to any of a variety of data. In other words, various exemplary techniques can be applied to data other than image data.

An exemplary LLD approach formulates within-class scatter and between-class scatter by means of similarity-weighted criteria. These criteria benefit from the advantages of Laplacian Eigenmaps and LPP. In this exemplary LLD approach, similarities can be computed from an exponential function of pair-wise distances in original sample spaces, which can be measured by either Euclidean or non-Euclidean metrics. Consequently, this LLD approach can be applied to any linear space for classification. The structural information of classes is governed by the within-class Laplacian matrix and the between class Laplacian matrix. These two matrices evolve with time which is a free parameter in the similarity measure. From this viewpoint, LDA is exactly a special case when the time approaches the positive infinity. Therefore, LLD not only overcomes the problems of non-Euclidean metrics but also presents an alternative way to find better discriminant subspaces.

As mentioned, trials were performed for face identification on a subset of facial database for FRGC version 2. Trial results are compared for the LLD method with PCA, LPP, LBP, and the traditional LDA.

In the trials, discriminant features were extracted on PCA and LBP expressive features, implying that LLD, LPP, and LDA are performed in the PCA and LBP transformed spaces, respectively. The PCA expressive features can be viewed as Euclidean whereas the LBP expressive features are non-Euclidean. Trial results show that an exemplary LLD approach outperforms various conventional methods in terms of discrimination power.

As mentioned, the conventional LDA approach to discrimination uses Euclidean distance as a metric measure; whereas, an exemplary approach uses similarity as the inherent characteristic of pair-wise points instead of Euclidean distance. In Laplacian Eigenmaps for manifold learning and its linearization LPP for clustering and recognition, geometric distances between mapped points that lie on an underlying manifold can be controlled by similarities between corresponding points in the original space while underlying clusters will appear automatically after non-linear maps. Linearization of such criteria can yield good performance in image indexing (e.g., for image searches), clustering, and face recognition. As described herein, an exemplary linear Laplacian algorithm allows for use of similarity to perform discrimination (e.g., Linear Laplacian Discrimination (LLD)). For example, discrimination can be used to perform tasks such as pattern recognition and classification.

FIG. 1 shows an exemplary method 100 for feature extraction from data using linear Laplacian discrimination. A provision block 104 provides data (e.g., data samples). A computation block 108 computes local similarities for the provided data (e.g., between data samples). A map block 112 maps the computed local similarities to weights. A formulation block 116 formulates scatter matrices and a maximization block 120 maximizes a scatter ratio.

In the example of FIG. 1, the mapping block 112 can map the computed local similarities to weights using a non-linear function. For example, an exponential function may be used that ranges from 0 to 1 where a weight of 0 (a minimum) corresponds to no similarity and a weight of 1 (a maximum) corresponds to infinite similarity. In contrast to LDA, where weights are always 1, in this example, LLD can use weights that vary from a minimum of 0 to a maximum of 1, where a higher weight means that a data sample is of higher importance. The mapping block 112 thus provides weights for similarity-weighted discrimination criteria.

In the example of FIG. 1, the formulation block 116 uses the similarity-weighted discrimination criteria to define a within-class Laplacian matrix and a between-class Laplacian matrix, which are referred to collectively as scatter matrices. In general, for purposes of discrimination, samples in the same class should be very "close" to each other and samples in different classes should be "far away" from each other.

As mentioned, a conventional LDA algorithm relies on the ratio of between-class scatter and within-class scatter which are represented by norms measured with Euclidean metrics (i.e., Euclidean distance-based metrics). In contrast, the maximization block 120 of FIG. 1 maximizes the ratio of the scatter by maximizing the ratio of the between-class scatter (inter-class and "far away") to the within-class scatter (intra-class and "close") based on similarity (e.g., similarity-weighted discrimination criteria). In turn, the maximization block 120 can find the optimal projection.

The method 100 of FIG. 1 can be applied using Euclidean spaces or non-Euclidean spaces for purposes of computing local similarities per computation block 108. In other words, for local similarities, Euclidean distance may be guaranteed to some extent "locally", which is not necessarily true globally. Hence, the computation block 108 can use Euclidean distance for computation of local similarities.

An exemplary method for extracting discriminant feature of samples can include providing data for samples in a multidimensional space (see, e.g., block 104); based on the data, computing local similarities for the samples (see, e.g., block 108); mapping the local similarities to weights (see, e.g., block 112); based on the mapping, formulating an inter-class scatter matrix and an intra-class scatter matrix (see, e.g., block 116); and, based on the matrices, maximizing the ratio of inter-class scatter to intra-class scatter for the samples (see, e.g., block 120) to, for example, provide discriminate features of the samples.

An exemplary method for extracting discriminant feature of samples may rely on a conventional approach to reduce dimensionality of a space. For example, an exemplary method may include providing data for samples in a multidimensional Euclidean space; reducing the dimension of the Euclidean space using principle component analysis (PCA); reducing the dimension of the PCA reduced space by computing similarities for the samples and mapping the similarities to weights using a non-linear function to thereby remove dependence on the Euclidean metric; formulating an inter-class scatter matrix and an intra-class scatter matrix; and, based on the matrices, maximizing the ratio of inter-class scatter to intra-class scatter for the samples to provide discriminate features of the samples.

As described herein, an exemplary method considers similarity as the inherent characteristics of pair-wise points (e.g., data samples) as opposed to conventional approaches that rely on Euclidean distance as the inherent characteristics of pair-wise points (e.g., data samples). Hence, in such an exemplary method geometric distances between mapped points that lie on an underlying manifold can be controlled by similarities between corresponding points in the original space. Further, underlying clusters can be uncovered via non-linear mapping. Such a method may be applied to tasks such as indexing, clustering, classifying and recognizing patterns.

With respect to discriminant scatters, let $x_i^s$ denote the i-th sample in the s-th class, where $x_i^s \in M^D$ and $M^D$ is the D-dimensional sample space. One can obtain the associated discriminant feature $y_i^s$ of $x_i^s$ by projection according to the following equation (Eqn. 1):

$$y_i^s = U^T x_i^s$$

where the d columns of the projection matrix U are the orthogonal bases of discriminant subspace. Let $X=[x_1, x_2, \ldots, x_n]$ denote all original samples, where n is the number of all samples. Then we have $Y=U^T X$, where $Y=[y_1, \ldots, y_n]$. Given two points $x_i^s$ and $x_i^t$, the Euclidean distance between them is defined by the following equation (Eqn. 2):

$$\|x_i^s - x_i^t\|_{R^D}^2 = \sum_{k=1}^{D}(x_{ik}^s - x_{ik}^t)^2.$$

where $x_{ik}^s$ is the k-th component of $x_i^s$.

Let $\alpha_s$ denote the within-class scatter of class s and define it according to the following equation (Eqn. 3):

$$\alpha_s = \sum_{i=1}^{c_s} w_i^s \|y_i^s - \bar{y}^s\|_{R^D}^2, \quad s = 1, \ldots, c$$

where $w_i^s$ is the weight, defined by the following equation (Eqn. 4):

$$w_i^s = \exp\left(-\frac{\|x_i^s - \bar{x}^s\|_{M^D}^2}{t}\right), \quad i = 1, \ldots, c_s$$

Here t is the time variable, and exp(•) denotes the exponential function. It suffices to note that the distance between $y_i^s$ and $\bar{y}^s$ are measured by the Euclidean norm $\|\cdot\|_{R^D}$, and the distance between $x_i^s$ and $\bar{x}^s$ are measured by the norm $\|\cdot\|_{M^D}$ which depends on the metric of the original sample space. The space may be Euclidean or non-Euclidean. To obtain a compact expression of Eqn. 3, let $W_s=\mathrm{diag}(w_1^s, w_2^s, \ldots, w_{c_s}^s)$ be a diagonal matrix and $Y_s=[y_1^s, y_2^s, \ldots, y_{c_s}^s]$. Besides, let $e_{c_s}$ denote the all-one column vector of length $c_s$. Then $\bar{y}^s = (1/c_s) Y_s e_{c_s}$. Rewriting Eqn. 3 provides the following series of equations (Eqns. 5-10):

$$\alpha_s = \sum_{i=1}^{c_s} w_i^s tr\{(y_i^s - \bar{y}^s)(y_i^s - \bar{y}^s)^T\}$$

$$= tr\left\{\sum_{i=1}^{c_s} w_i^s y_i^s (y_i^s)^T\right\} - 2tr\left\{\sum_{i=1}^{c_s} w_i^s y_i^s \left(\frac{1}{c_s} Y_s e_{c_s}\right)^T\right\} +$$

$$tr\left\{\sum_{i=1}^{c_s} w_i^s \left(\frac{1}{c_s} Y_s e_{c_s}\right)\left(\frac{1}{c_s} Y_s e_{c_s}\right)^T\right\}$$

$$= tr(Y_s W_s Y_s^T) - \frac{2}{c_s} tr\{Y_s W_s e_{c_s} (e_{c_s})^T Y_s^T\} +$$

$$\frac{e_{c_s} W_s (e_{c_s})^T}{c_s^2} tr(Y_s e_{c_s} (e_{c_s})^T Y_s^T).$$

With Eqns. 5-10, one may obtain the following equation (Eqn. 11):

$$\alpha_s = tr(Y_s L_s Y_s^T)$$

where the following equation provides for $L_s$ (Eqn. 12):

$$L_s = W_s - \frac{2}{c_s} W_s e_{c_s} (e_{c_s})^T + \frac{e_{c_s} W_s (e_{c_s})^T}{c_s^2} e_{c_s} (e_{c_s})^T$$

By letting $\alpha$ denote the total within-class scatter of all samples, the following equation results (Eqn. 13):

$$\alpha = \sum_{s=1}^{c} \alpha_s = \sum_{s=1}^{c} tr(Y_s L_s Y_s^T)$$

In this analysis, there is a 0-1 indicator matrix $S_s$ satisfying $Y_s = Y S_s$. Each column of $S_s$ records the class information which is known for supervised learning. Substituting the expression of $Y_s$ into Eqn. 13 gives the following equation (Eqn. 14):

$$\alpha = \sum_{s=1}^{c} tr(YS_s L_s S_s^T Y^T) = tr(YL_\omega Y^T)$$

where $L_\omega$ is given by the following equation (Eqn. 15):

$$L_w = \sum_{s=1}^{c} S_s L_s S_s^T$$

which is the within-class Laplacian matrix. If the matrix X is ordered such that samples appear by class $X=[x^1_1, \ldots, x^1_{c1}, \ldots, x^c_1, \ldots, x^c_{cc}]$, then the within-class Laplacian matrix $L_\omega$ reads the diagonal block form of $L_\omega=\text{diag}(L_1, L_2, \ldots, L_c)$. Such alignment technique is applicable for problems that can be formulated as the similar expression (see Eqn. 11).

Plugging the expression of Y into Eqn. 14, one arrives at the final form of the total within-class scatter per the following equation (Eqn. 16):

$$\alpha = tr(U^T D_\omega U)$$

where $D_\omega = XL_\omega X^T$ is the within-class scatter matrix.

Next, the between-class scatter of all classes can be defined according to the following equation (Eqn. 17):

$$\beta = \sum_{s=1}^{c} w^s \|\bar{y}^s - \bar{y}\|^2_{\mathcal{R}^D}, s = 1, \ldots, c$$

where $w_s$ is defined by the following equation (Eqn. 18):

$$w^s = \exp\left(-\frac{\|\bar{x}^s - \bar{x}\|^2_{\mathcal{A}^D}}{t}\right)$$

Let $\bar{Y}=[\bar{y}^1, \ldots, \bar{y}^c]$ denote the matrix consisting of all center vectors of classes and $W_b=\text{diag}(w^1, w^2, \ldots, w^c)$. Following similar formulations from Eqn. 5 to Eqn. 12, one can rewrite Eqn. 17 as the following equation (Eqn. 19):

$$\beta = tr(\bar{Y} L_b \bar{Y}^T)$$

where $L_b$ can be presented as the following equation (Eqn. 20):

$$L_b = W_b - \frac{2}{c} W_b e_c (e_c)^T + \frac{e_c W_b (e_c)^T}{c^2} e_c (e_c)^T$$

which is the between-class Laplacian matrix. By letting $\bar{X}=[\bar{x}^1, \ldots, \bar{x}^c]$ one has $\bar{Y}=U^T \bar{X}$. Rewriting Eqn. 19 yields the following equation (Eqn. 21):

$$\beta = tr(U^T D_b U)$$

where $D_b = \bar{X} L_b \bar{X}^T$ is called the between-class scatter matrix.

With respect to finding the optimal projection (see, e.g., the maximization block 120 of FIG. 1), to make projected samples favor of classification in feature space, it is expected that samples within the same classes cluster as close as possible and samples between classes separate as far as possible.

An examination of the formulations of the within-class scatter (Eqn. 3) and the between-class scatter (Eqn. 17) shows that the smaller the distance between $x^s_i$ and $\bar{x}^s$ is, the larger the similarity $w^s_i$ is. If the within-class scatter $\alpha_s$ remains constant, from Eqn. 3, it is known that $\|y^s_i - \bar{y}^s\|\mathcal{R}^D$ will be small if the weight $w^s_i$ is large, implying that $y^s_i$ will be close to its center $\bar{y}^s$. So, $y^s_i$ will approach its center $\bar{y}^s$ as $\alpha_s$ approaches the minimum. Therefore, the expectation on within-class samples will be fulfilled if the total within-class scatter $\alpha$ is minimized.

By the similar analysis, the expectation on between-class samples being far apart will be realized if the between-class scatter $\beta$ is maximized. To summarize, the following dual-objective optimization model results (Eqn. 22):

$$\begin{cases} \underset{U}{\text{argmin}}\, tr(U^T D_w U) \\ \underset{U}{\text{argmax}}\, tr(U^T D_b U) \\ U^T U = I_d. \end{cases}$$

To simplify the optimization, the following Fisher criterion may be constructed according to the following equation (Eqn. 23):

$$\hat{\jmath}(U) = \frac{\beta}{\alpha} = \frac{tr(U^T D_b U)}{tr(U^T D_w U)}$$

Then the optimization reduces to the similar fashion of the conventional LDA according to the following equation (Eqn. 24):

$$\begin{cases} \underset{U}{\text{argmax}}\, \hat{\jmath}(U) \\ U^T U = I_d. \end{cases}$$

To solve for U, the above optimization can be performed on Grassmann manifolds where U is viewed as a point on geodesic flows. As described in this exemplary analysis, an approach used in conventional LDA may be taken to solve the above optimization problem. For example, take the d eigenvectors from the following generalized eigen-analysis according to the following equation (Eqn. 25):

$$D_b u_i = \lambda_i D_\omega u_i$$

that are associated with the d largest eigen-values $\lambda_i$, i=1, ..., d.

Like LDA, LLD encounters some computational issues when $D_\omega$ is singular. $D_\omega$ is not invertible when $L_\omega$ is not of full rank. Such cases can occur frequently in computer vision since images may have large dimensions whereas the number of classes is usually small. However, the generalized eigen-analysis of Eqn. 25 needs a positive definite $D_\omega$. Several strategies exist to address the issue; consider the following two approaches.

Exemplary Approach I: PCA Subspace

When the original sample space is Euclidean, discriminant features can be extracted from expressive features yielded by PCA. Namely LLD can be performed in the PCA-transformed space. Specifically, let $U_{PCA}$ denote the matrix whose columns are a set of orthogonal base of the principal subspace. First project $\tilde{D}_\omega$ and $\tilde{D}_b$ into the PCA-transformed space to give $\tilde{\tilde{D}}_\omega = (U_{PCA})^T \tilde{D}_\omega U_{PCA}$ and $\tilde{\tilde{D}}_b = (U_{PCA})^T \tilde{D}_b U_{PCA}$. Then one can perform the generalized eigen-analysis of Eqn. 25 using $\tilde{\tilde{D}}_\omega$ and $\tilde{\tilde{D}}_b$. By letting $U_{LLD}$ denote the discriminant subspace, one can then represent the final transformation as $U_{PCA}U_{LLD}$.

Exemplary Approach II: Dual Subspaces

In this approach, let the eigen-decomposition of $D_\omega$ be $D_\omega = V\Lambda V^T$, where V is the eigen-vector matrix and $\Lambda$ is the diagonal eigenvalue matrix. Suppose V is split into $V=[V_1, V_2]$, where $V_1$ consists of eigenvectors corresponding to the r non-zeros eigenvalues and $V_2$ consists of eigenvectors associated with the d zero eigenvalues, where r is the rank of $D_\omega$. In a dual-subspace, a goal is to project $D_b$ into $V_1$ and $I - V_1 V_1^T$ respectively, then perform eigen-analysis on the projected between-class scatter matrices, which can be viewed as projecting the center of each class in the two spaces and performing PCA, respectively. Next one can compute $D_b^1 = V_1^T D_b V_1$ and $D_b^2 = V_2^T D_b V_2$. Now, let $Q_1$ and $Q_2$ denote the principal eigenvector matrices of $D_b^1$ and $D_b^2$, respectively. Then one arrives at two dual projection matrices $W_1 = V_1 Q_1$ and $W_2 = V_2 Q_2$.

Given two samples $x_i$ and $x_n$, the distance between their feature vectors $y_i$ and $y_j$ is determined by the following equation (Eqn. 26):

$$d(y_i, y_j) = \|W_1^T(x_i - x_j)\| \mathbb{R}^d + \|W_2^T(x_i - x_j)\| \mathbb{R}^d$$

Note that, for LDA, projecting samples only on the subspace spanned by $W_1$ is essentially akin to tackling the singular problem of the within-class scatter matrix by simultaneous diagonalization. As presented, the dual LLD and the dual LDA means that LLD and LDA are performed by dual subspaces.

Comparisons to Other Approaches

An exemplary LLD approach becomes like LDA as t approaches positive infinity in the similarity functions of Eqns. 4 and 18. So, the discriminant subspace of LDA is a stable state of the evolution of that of LLD with respect to the time t. Therefore, LLD is a more general version of LDA, as such, an exemplary LLD approach inherits the strengths of an LDA approach.

The LLD method also has some relationship to LDE and MFA approaches. Overall, the LDE and MFA approaches can be viewed as specific forms of graph embedding. However in principle, they are essentially different. LDE and MFA are more complicated as they take advantage of the partial structural information of classes and neighborhoods of samples at the same time while LDA and LLD purely explore the information of classes for discrimination.

Trials

As mentioned, trials focused on the problem of face identification. Given a novel face, the identification problem is that the system is asked to find the identity of the person in a gallery where the portrait of the person is presented. The motivation of this task comes from the current trends of performing face recognition or retrieval based on the facial images on the web or photos in digital family albums. In such cases, one is usually interested in finding the most similar faces of a given sample, which can be converted to be the face identification problem.

In the trials, related experiments were performed on a subset of facial data in experiment 4 of FRGC version 2. The query set for experiment 4 in this database consists of single uncontrolled still images which contains all the diverse factors of quality presented in the preceding subsection. There are 8014 images of 466 subjects in the set. However, there are only two facial images available for some persons. To help guarantee meaningful results for the tasks given above, a subset in the query set was selected for performing trials.

To ensure reproduction of the trials, procedures were performed as follows. First, all images of each person in the set were searched and the first ten facial images taken if the number of facial images was not less than ten. This resulted in 3160 facial images of 316 subjects. Then, the 316 subjects were divided into three subsets. The first 200 subjects were used as a gallery and probe set and the remaining 116 subjects were used as a training set. Second, the first five facial images of each person were taken as the gallery set and the remaining five images as the probe set. Therefore, the set of persons for training is disjoint with that of persons for the gallery and the probe.

TABLE 1

Information of facial data for the experiments. These sets were selected from the query set for experiment 4 of FRGC version 2.

| Set | Number of Subjects | Number of Images |
|---|---|---|
| Training | 116 | 1160 |
| Gallery | 200 | 1000 |
| Probe | 200 | 1000 |

Table 1 contains the information of facial data for experiments. The facial images were aligned according to the positions of eyes and mouth of each person. Each facial image was cropped to a size of 64×72.

Figure 2:
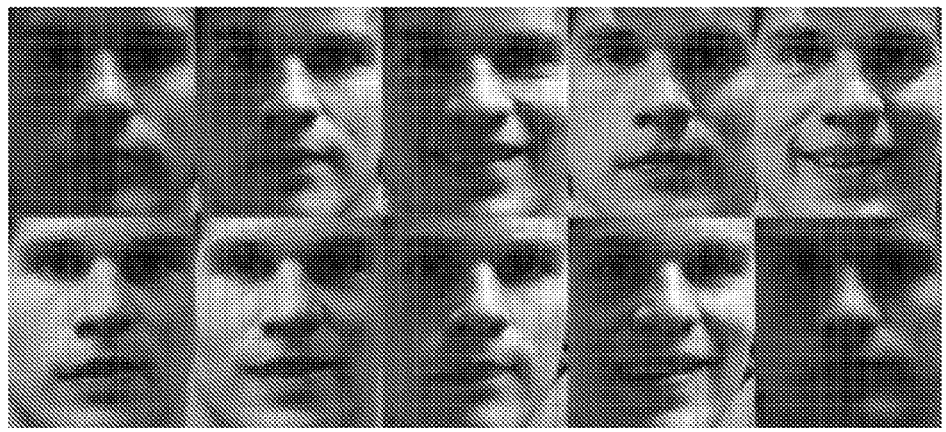
FIG. 2 is a series of images for trials of an exemplary linear Laplacian discrimination (LLD) technique.

FIG. 2 shows ten images 200 of one subject where facial images in the first row were in the gallery set 202 while those in the second row were in the probe set 204.

Discriminant feature extraction was performed on the expressive features yielded by PCA and LBP, respectively. This means that LLD, LPP, and LDA were performed in the PCA and LBP transformed spaces, respectively. As mentioned, PCA is the classic and well-recognized method for expressive feature extraction while LBP is a newer approach which has proven effective for un-supervised feature extraction. The PCA feature space is Euclidean. The distances in this space are measured by the Euclidean norm (Eqn. 2). The LBP feature space is non-Euclidean. A distance measure in such a space is the Chi square, defined by the following equation (Eqn. 27):

$$\chi^2(x_i^s, x_i^t) = \sum_{k=1}^{D} \frac{(x_{ik}^s - x_{ik}^t)^2}{x_{ik}^s + x_{ik}^t}$$

For comparison, PCA and LBA were taken as baselines.

For the conventional PCA-based two step strategy, the number of principal components is a free parameter. The dimension of principal subspaces significantly affects the performance of recognition for the PCA plus LDA strategy. Studies confirmed by experiments that the optimal number lies in the interval of 50 to 200. Based on such studies, for a baseline, a search for the optimal number of principal components in this interval found that PCA performs best when the dimension of feature vectors is 190. Hence, 190 was taken as the number of principal components.

Figure 3:
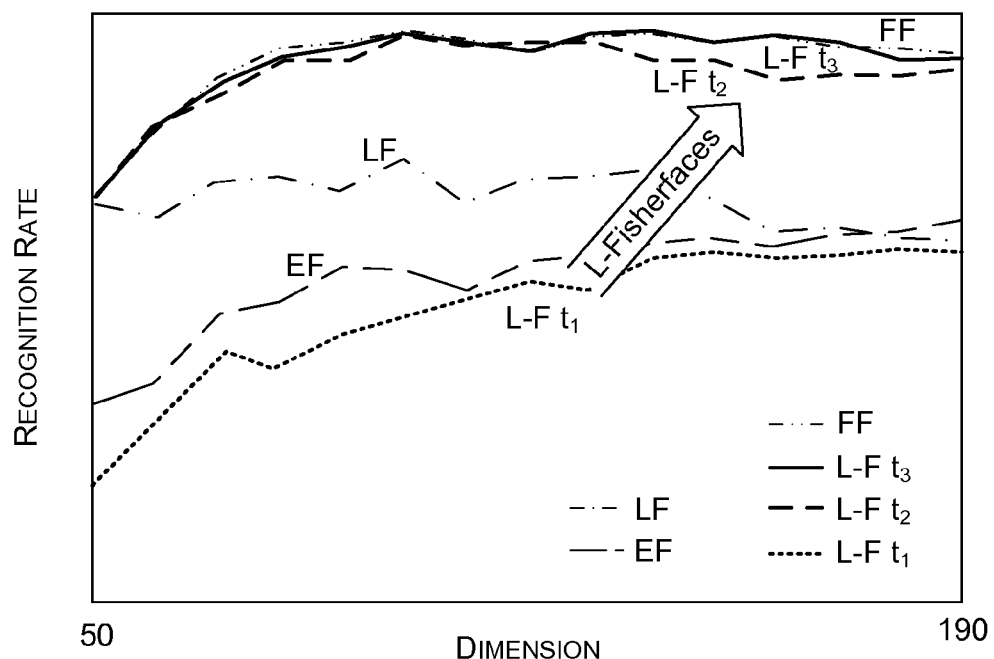
FIG. 3 is a plot of recognition rate versus dimension for an exemplary "L-Fisherfaces" approach.

An exemplary approach was named "Laplacian Fisherfaces ("L-Fisherfaces"); noting that it is Laplacian-kernelized and formulated by Fisher criterion. As shown in a plot 300 of FIG. 3, L-Fisherfaces converge to Fisherfaces with a fast speed (within t=1), as shown by recognition rates based on PCA features. In the plot 300, Eigenfaces (EF) is the baseline and Eigenfaces (EF; PCA), Laplacianfaces (LF; PCA plus LPP), Fisherfaces (FF; PCA plus LDA), and Lapalcian Fisherfaces (L-Fisherfaces or L-F; PCA plus LLD) were tested. As mentioned, 190 principal components were taken in the PCA step due to that PCA performs best in this dimension; the plot 300 ranges from a dimension of 50 to 190 and $t_1=0.01$, $t_2=0.1$, $t_3=1$, $t_4=10$, and $t_5=100$. Laplacian Fisherfaces (L-F) converge to Fisherfaces (FF) with a fast speed in the Euclidean feature space.

The best performance of LLD was shown as approximately achieved when LLD arrived at its stable state where each $W_s$ was essentially the identity matrix when $t \geq 100$. This result means that the principal subspace of LLD yields the best discriminant performance in the Euclidean feature space when it approaches the stable state. The trials also examined visually the various eigenfaces and their evolution across time.

Trials were also performed with LBP for each facial image, which were then sub-divided by 7×7 grids. Histograms with 59 bins were performed on each sub-block. A LBP feature vector was obtained by concatenating the feature vectors on subblocks. For the trials, 58 uniform patterns for LBP were used where each uniform pattern accounted for a bin. The remaining 198 binary patterns were put in another bin, resulting in a 59-bin histogram. So, the number of tuples in a LBP feature vector was 59×(7×7)=2891. The parameters of (8, 2) for LBP were adopted. Namely, the number of circular neighbors for each pixel was 8 and the radius of the circle was 2.

Figure 4:
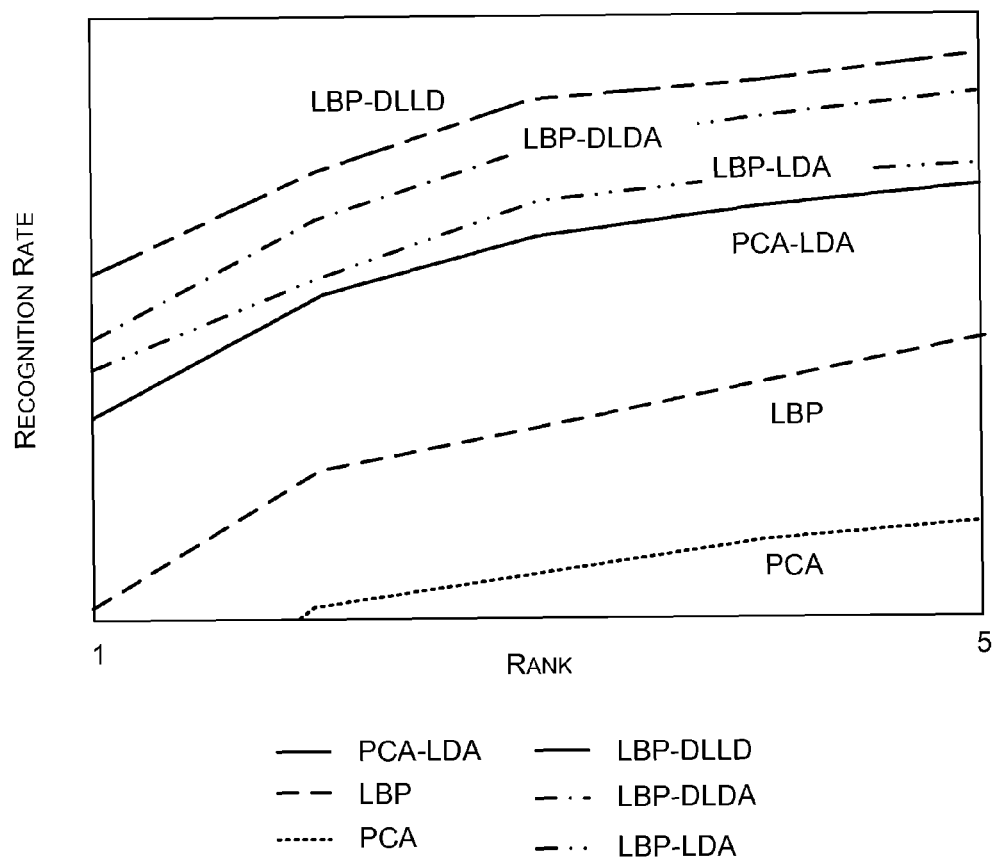
FIG. 4 is a plot of recognition rate versus rank for an exemplary "LBP-Dual LLD" technique.

FIG. 4 shows a plot 400 of recognition rate versus rank where ranks is the top n criteria applied in the FERET evaluation methodology. In the plot 400, dual LLD (t=500) (LBP-DLLD) consistently outperforms various other methods (see acronyms in the plot 400), achieving a recognition rate of 92.6%; whereas, the baseline (LBP) achieves only 86.6%. Hence, the performance of LLD is equivalent to that of LDA for Euclidean features. However, LLD shows superiority to LDA for non-Euclidean features. As discussed, performance of LDA is limited when the feature space is non-Euclidean. As described herein, and shown in trials for face recognition, LLD performs better than LDA without being as limited by change of attributions of feature spaces.

As described herein, an exemplary technique uses LLD for pattern classification and discriminant feature extraction. This technique uses similarity weighted discriminant criteria to define a within-class Laplacian matrix and a between-class Laplacian matrix. This LLD approach has the flexibility of finding optimal discriminant subspaces.

Trials performed on a subset in FRGC version 2 demonstrated that an exemplary LLD approach is at least equivalent to a conventional LDA approach when the feature space is Euclidean and is superior to the conventional LDA approach when the feature space is non-Euclidean. In addition, an exemplary LLD approach can significantly improve discriminant performance of expressive facial features yielded by PCA and LBP. These trial results indicate that discriminant criterions formulated in an exemplary LLD approach are more suitable for discriminant feature extraction than various other conventional techniques.

As discussed herein, whether a sample space is Euclidean or non-Euclidean, an exemplary LLD approach is capable of capturing discriminant characteristics of samples.

Figure 5:
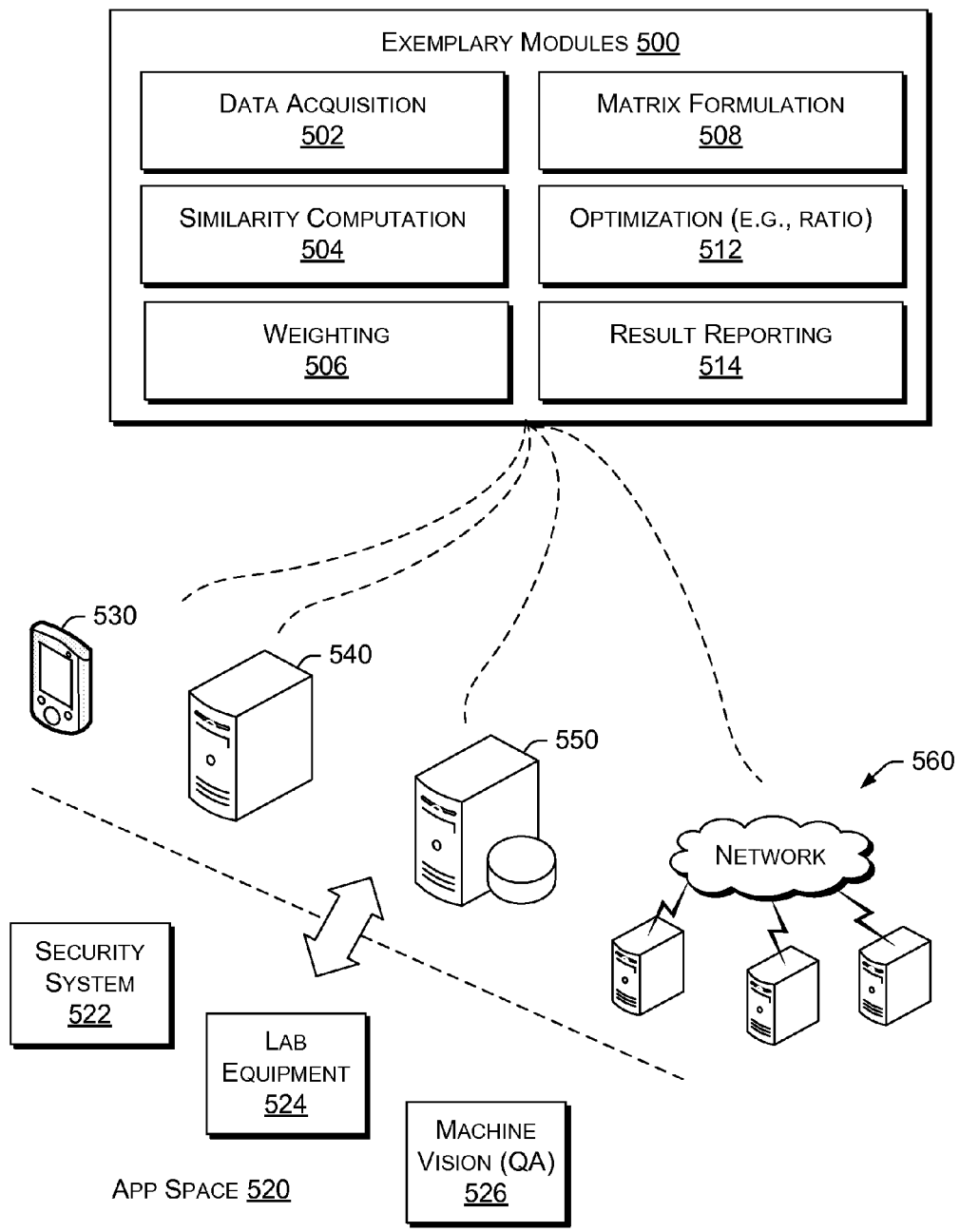
FIG. 5 is a diagram of exemplary modules and computing devices that may operate using one or more of the modules.

As described herein, an exemplary method may be implemented in the form of processor or computer executable instructions. For example, a computing device may include instructions and associated circuitry to perform an exemplary LLD method. FIG. 5 shows various exemplary modules 500 that include such instructions. One or more of the modules 500 may be used in a single device or in multiple devices to form a system. Some examples are shown as a portable device 530, a personal computer 540, a server with a datastore 550 and a networked system 560 (e.g., where the network may be an intranet or the Internet). The devices may interact or operate as part of a system in an application space 520. For example, the application space 520 shows a security system 522, lab equipment 524 and machine vision for quality assurance 526.

The modules 500 include a data acquisition module 502 to acquire data, a similarity computation module 504 to compute similarities, a weighting module 506 to weight similarities, a matrix formulation module 508 to formulate matrices (e.g., scatter matrices), an optimization module 512 to perform optimizations (e.g., based on ratio of intra- to inter-class scatter) and a results reporting module 514 to report results or take further action.

In a particular example, a security system 522 may rely on biometrics (e.g., facial recognition). Such a system may include a video or still picture camera. A computing device may include the acquisition module 502 to acquire information from the video or still picture camera. Data acquisition may also prepare data for analysis, for example, as described with respect to the trials. The computing device may report results to the security system according to the reporting module 514 to cause an action to occur (e.g., open a door, a gate, a vault, etc.).

In another example, lab equipment 524 may rely on spectroscopic data or other data that is expected to include some inter-class and intra-class relationships. Such a system may acquire information in a multidimensional manner (e.g., two-dimensional or more). For example, spectroscopy equipment may acquire data that can be presented in a format similar to an image. In other instances, a microscope may capture images of cells, crystals, etc. A computing device may include the acquisition module 502 to acquire information from the lab equipment. Data acquisition may also prepare data for analysis, for example, as described with respect to the trials. The computing device may report results to the lab equipment or to a lab technician according to the reporting module 514 to cause an action to occur (e.g., to raise temperature of a lab sample, add a chemical to a mixture, etc.).

In yet another example, machine vision equipment 526 may rely on visual data that is expected to include some inter-class and intra-class relationships. Such a system may acquire information in a multidimensional manner (e.g., two-dimensional or more). For example, a camera on an assembly line may acquire data of assemblies for purposes of quality control. In other instances, a video camera may track motion. A computing device may include the acquisition module 502 to acquire information from the machine vision equipment. Data acquisition may also prepare data for analysis, for example, as described with respect to the trials. The computing device may report results to the machine vision equipment or to a technician according to the reporting module 514 to cause an action to occur (e.g., to stop an assembly line, to adjust an assembly or manufacturing process, etc.).

Exemplary Computing Device

Figure 6:
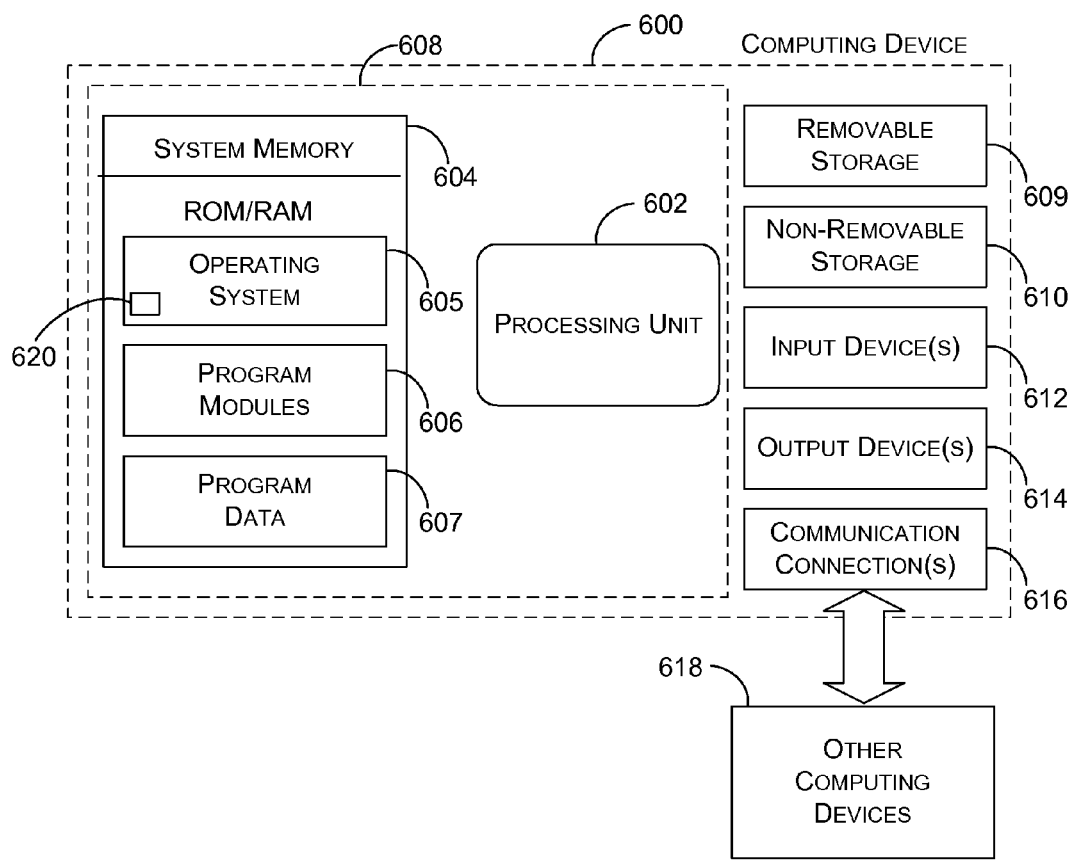
FIG. 6 is a block diagram of an exemplary computing device.

FIG. 6 illustrates an exemplary computing device 600 that may be used to implement various exemplary components and in forming an exemplary system. For example, the computing devices or systems of FIG. 5 may include various features of the device 600.

In a very basic configuration, computing device 600 typically includes at least one processing unit 602 and system memory 604. Depending on the exact configuration and type of computing device, system memory 604 may be volatile (such as RAM), non-volatile (such as ROM, flash memory, etc.) or some combination of the two. System memory 604 typically includes an operating system 605, one or more program modules 606, and may include program data 607. The operating system 605 include a component-based framework 620 that supports components (including properties and events), objects, inheritance, polymorphism, reflection, and provides an object-oriented component-based application programming interface (API), such as that of the .NET™ Framework manufactured by Microsoft Corporation, Redmond, Wash. The device 600 is of a very basic configuration demarcated by a dashed line 608. Again, a terminal may have fewer components but will interact with a computing device that may have such a basic configuration.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by removable storage 609 and non-removable storage 610. Computer storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of device 600. Computing device 600 may also have input device(s) 612 such as keyboard, mouse, pen, voice input device, touch input device, etc. Output device(s) 614 such as a display, speakers, printer, etc. may also be included. These devices are well known in the art and need not be discussed at length here.

Computing device 600 may also contain communication connections 616 that allow the device to communicate with other computing devices 618, such as over a network (e.g., consider the aforementioned network of FIG. 5). Communication connections 616 are one example of communication media. Communication media may typically be embodied by computer readable instructions, data structures, program modules, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, implemented in part by a computing device, for extracting discriminant features of samples, the method comprising:
    providing data for samples in a multidimensional space;
    based on the data, computing local similarities for the samples using a similarity measure that employs a non-Euclidean distance metric and in which a time parameter is a free parameter;
    mapping the local similarities to weights, based at least partly on the non-Euclidean distance metric;
    based on the mapping, formulating an inter-class scatter matrix and an intra-class scatter matrix; and
    based on the matrices, maximizing a ratio of inter-class scatter to intra-class scatter for the samples to provide the discriminant features of the samples.

2. The method of claim 1 wherein the mapping comprises a non-linear function.

3. The method of claim 2 wherein the non-linear function comprises an exponential function of pair-wise distances computed using the non-Euclidean distance metric.

4. The method of claim 1 wherein the local similarity increases with respect to decreasing distance between a sample and a sample mean.

5. The method of claim 1 wherein the local similarity increases with respect to decreasing distance between a sample in a class and a sample mean for the class.

6. The method of claim 1 wherein the discriminant features correspond to a number of principle components.

7. The method of claim 1 wherein the multidimensional space comprises a Euclidean space.

8. The method of claim 1 wherein the multidimensional space comprises a non-Euclidean space.

9. The method of claim 1 wherein the data comprise image data.

10. The method of claim 1 wherein the data comprise audio data.

11. The method of claim 1 further comprising classifying the samples using the discriminant features.

12. The method of claim 1 wherein the data comprise image data for faces and further comprising identifying a face using the discriminant features.

13. The method of claim 1 further comprising recognizing patterns using the discriminant features.

14. One or more computer-readable storage device comprising computer-executable instructions to perform the method of claim 1.

15. A method, implemented in part by a computing device, for extracting discriminant feature of samples, the method comprising:
    providing data for samples in a multidimensional Euclidean space;
    reducing the dimension of the Euclidean space using principle component analysis (PCA);
    reducing the dimension of the PCA reduced space by computing similarities for the samples using a similarity measure that employs a non-Euclidean distance metric and in which a time parameter is a free parameter;
    mapping the computed similarities to weights using a non-linear function to remove dependence on the Euclidean space;
    formulating an inter-class scatter matrix and an intra-class scatter matrix; and
    based on the matrices, maximizing the ratio of inter-class scatter to intra-class scatter for the samples to provide discriminant features of the samples.

16. The method of claim 15 wherein the data comprise image data.

17. The method of claim 15 wherein the data comprise audio data.

18. The method of claim 15 further comprising classifying the samples using the discriminant features or recognizing patterns using the discriminant features.

19. One or more computer-readable storage device comprising computer-executable instructions to perform the method of claim 15.

20. A computing device comprising:
one or more processors;
memory; and
executable instructions to:
acquire data for samples in a multidimensional space,
compute local similarities for the samples using a similarity measure that employs a non-Euclidean distance metric and in which a time parameter is a free parameter,
map the local similarities to weights, using a non-linear function to remove dependence on a Euclidean space,
formulate an inter-class scatter matrix and an intra-class scatter matrix, and
maximize a ratio of inter-class scatter to intra-class scatter for the samples to provide discriminant features of the samples.

* * * * *